UNITED STATES PATENT OFFICE.

GILBERT E. BAILEY, OF LOS ANGELES, CALIFORNIA.

PROCESS OF MAKING MATERIAL FOR EXPLOSIVES.

989,519.  Specification of Letters Patent.  Patented Apr. 11, 1911.

No Drawing.  Application filed July 13, 1909.  Serial No. 507,444.

*To all whom it may concern:*

Be it known that I, GILBERT E. BAILEY, a citizen of the United States, residing at Los Angeles, in the county of Los Angeles and State of California, have invented a new and useful Process of Making Material for Explosives, of which the following is a specification.

In the manufacture of explosives wherein nitrated rosin and starchy materials are used in combination with suitable chlorates, it has heretofore been difficult to proportion the amount of nitric acid used and not to exceed the necessary quantity to properly create the required action and produce a composition in which there remains no free nitric acid.

The object of my invention is to provide a process whereby rosin and starchy materials, such as ground wheat, may be perfectly nitrated and oxidized by the use of nitric acid without the liability of any free nitric acid remaining in the nitrated material.

Another object of my invention is to provide a process whereby rosin and a starchy material may be thoroughly mixed, nitrated and oxidized by the use of nitric acid, and cleared of all free nitric acid which may be present after the nitration and oxidation of the mass.

My process consists in mixing rosin and a starchy material, such for instance as finely ground or pulverized wheat, together with boiling water, adding thereto, after such mixing, strong nitric acid, thoroughly stirring the acid into the mixed rosin and starchy material until it ceases to give off fumes of nitrous oxid, then immediately washing out the free nitric acid from the nitrated and oxidized mass with hot water at or about 212° F.

In carrying out my process I take the required amount of a resinous material and a starchy material, such as finely ground wheat, and mix them together by stirring, then adding boiling hot water until they have formed themselves into a pasty mass, meanwhile subjecting the mass to a heat sufficient, combined with the heat of the hot water added during the mixing, to partially cook the starch, say from 180° to 212° F. I then take strong nitric acid and pour the same over the hot mass in a sufficient quantity to cover it, the quantity of nitric acid used not exceeding the amount which would in conjunction with the water in the mass form a solution of twenty per cent. of acid, meanwhile keeping the mass and acid from becoming cold. The mass and acid is then stirred or worked so as to thoroughly expose all parts of the mass to the action of the acid, such stirring or working being continued until fumes of nitrous oxid are no longer evolved therefrom. The then nitrated and oxidized mass is kneaded and washed in hot water whereby the free nitric acid is washed out of the mass; and afterward the mass is allowed to cool and dry producing a brittle crystalline material easily crushed for use in an explosive mixture.

By reason of the large proportion of water in the mass and the consequent dilution of the nitric acid, a considerable portion of the rosin (colophony) is converted into isophthalic acid, (see *Watts Dict. Chem.*, edition 1907, Vol. IV, "Isophthalic Acid", page 165, No. 9, under "Formation of Isophthalic Acid"; also under "Abietic Acid", Vol. I, page 1, No. 6, under "Reactions"), which contains no nitrogen; but is practically oxidized rosin. Rosin so treated is more combustible and better adapted for use in explosives, as stated. The free or excess nitric acid being then washed out with boiling water, the resulting product is left completely clear of free nitric acid and is not liable to deterioration and can be stored and transported without danger.

I have discovered that a resinous material and a starchy material can be mixed or incorporated into a pasty mass by the addition of hot water, and that such pasty mass will retain its pasty-like nature when treated with nitric acid to nitrate and oxidize the mass provided, however, that such mass is kept at a suitable temperature and not allowed to cool, say from 180° to 212° F. If the mass is allowed to cool during the process it will set and become hard.

After the nitric acid has acted upon the partially cooked mass the nitrated and oxidized starches and rosins are insoluble in water and by washing the same in hot water the mass is kept heated and retains a plastic condition which enables me to knead or work the same to wash the free nitric acid from the mass the same as butter milk is washed from butter in the ordinary dairying process.

The plastic mass is subjected to the kneading or washing in hot water, the water being changed as often as necessary, until all of the free nitric acid is washed out, after which the mass is placed in the sun to dry. When the mass has cooled and become dry it is of a hard and crystalline nature and is easily crushed into fine particles ready for incorporation or admixture with other explosive ingredients to form an explosive compound. The pulverized nitrated material is then used by mixing the same with a suitable chlorate in the manufacture of explosives by adding a suitable solvent to the nitrated and oxidized compound, such as wood alcohol which dissolves it so that it may be applied as a coating to the chlorate grains. The nitrated and oxidized mixture being insoluble in water is especially adaptable for use in making a water and moisture proof explosive compound.

It is necessary to maintain the temperature of the mixture at a point near that of boiling water during the mixing of the nitric acid therewith and the washing of the nitrated and oxidized material with the water to remove the free acid for the reason that if the mass becomes chilled after the acid treatment it will become hard and brittle, but if the temperature is kept at or near the point indicated the mass will remain in a plastic condition suitable for kneading or working to wash or press out the free nitric acid.

What I claim is:

1. The process of producing an oxidized and nitrated material for use in explosives, consisting in mixing rosin and a starch-containing material together, adding boiling water to the same to form a paste-like mass, adding nitric acid to the paste and mixing the same together and thereby causing partial oxidation of the rosin and nitration of the starch-containing material and then washing the mass in hot water until the same is free from nitric acid.

2. The process of producing an oxidized and nitrated material for use in explosives, consisting in mixing rosin and a starch-containing material together, stirring the same, adding boiling water thereto to form a pasty mass, adding nitric acid thereto, forming with the water in the mass a dilute nitric acid solution, heating the mixture, stirring the mixture until fumes of nitrous oxid are no longer evolved, and washing the resultant mass in hot water to clear it from free nitric acid.

3. The process of producing an oxidized and nitrated material for use in explosives, consisting in mixing a resinous material with finely ground wheat, adding boiling water to the mixture and heating the same to partially cook the starch contained therein, adding nitric acid to the mixture, such acid forming together with the water in the mixture a dilute solution of nitric acid, mixing the same until the fumes of nitrous oxid are no longer evolved, then washing the partially oxidized and nitrated mass in hot water to clear it from free nitric acid, drying the product, and pulverizing the same.

In testimony whereof, I have hereunto set my hand at Los Angeles, California, this 8th day of July, 1909.

GILBERT E. BAILEY.

In presence of—
F. M. TOWNSEND,
ARTHUR P. KNIGHT.

Copies of this patent may be obtained for five cents each, by addressing the "Commissioner of Patents, Washington, D. C."